(12) United States Patent
Wang et al.

(10) Patent No.: US 11,706,687 B2
(45) Date of Patent: Jul. 18, 2023

(54) IPV6 NODE MOBILITY MANAGEMENT METHOD BASED ON RPL ROUTING PROTOCOL

(71) Applicant: CHONGQING UNIVERSITY OF POSTS AND TELECOMMUNICATIONS, Chongqing (CN)

(72) Inventors: Ping Wang, Chongqing (CN); Chenggen Pu, Chongqing (CN); Yandan Yin, Chongqing (CN); Zhao Yang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 270 days.

(21) Appl. No.: 17/298,576

(22) PCT Filed: Oct. 21, 2019

(86) PCT No.: PCT/CN2019/112156
§ 371 (c)(1),
(2) Date: May 30, 2021

(87) PCT Pub. No.: WO2020/114111
PCT Pub. Date: Jun. 11, 2020

(65) Prior Publication Data
US 2022/0053405 A1    Feb. 17, 2022

(30) Foreign Application Priority Data
Dec. 4, 2018 (CN) .......................... 201811476188.1

(51) Int. Cl.
*H04W 40/16* (2009.01)
*H04L 1/1607* (2023.01)
(Continued)

(52) U.S. Cl.
CPC .......... *H04W 40/16* (2013.01); *H04L 1/1607* (2013.01); *H04L 45/74* (2013.01); *H04W 4/06* (2013.01); *H04W 40/125* (2013.01)

(58) Field of Classification Search
CPC ... H04W 40/16; H04W 40/125; H04W 40/12; H04W 40/36; H04W 4/06; H04L 1/1607; H04L 45/74
See application file for complete search history.

(56) References Cited

U.S. PATENT DOCUMENTS 11,070,462 B2 * 7/2021 Jadhav ................. H04L 45/123
11,368,393 B2 * 6/2022 Vedantham .......... H04L 45/488
(Continued)

FOREIGN PATENT DOCUMENTS

CN    101827416 A    9/2010
CN    105848238 A    8/2016
(Continued)

OTHER PUBLICATIONS

International Search Report for PCT/CN2019/112156 dated Jan. 8, 2020, ISA/CN.
(Continued)

*Primary Examiner* — Min Jung
(74) *Attorney, Agent, or Firm* — Yue (Robert) Xu; Apex Attorneys at Law, LLP

(57) ABSTRACT

The present invention relates to an IPv6 wireless sensor network node mobility management method based on RPL routing protocol. The present invention achieves the following: first, placing an RSSI in an ACK frame so as to detect the mobile state of a node and improve the accuracy of mobile detection; second, on the premise of compatibility with an original RPL routing protocol, improving the options for DIS and DAO in selecting the optimal parent node and updating a routing table; and finally, designing a (Continued)

cache method to prevent messages sent to the mobile node from being lost in the process of moving, and designing a new 6LoWPAN header so as to complete message caching.

10 Claims, 3 Drawing Sheets

(51) Int. Cl.
  *H04L 45/74* (2022.01)
  *H04W 4/06* (2009.01)
  *H04W 40/12* (2009.01)

(56) References Cited

U.S. PATENT DOCUMENTS

| | | | | |
|---|---|---|---|---|
| 2014/0247726 | A1* | 9/2014 | Vasseur | H04W 40/248 370/236 |
| 2015/0195136 | A1* | 7/2015 | Mermoud | G06N 5/025 706/12 |
| 2016/0165567 | A1 | 6/2016 | Liu | |
| 2016/0182306 | A1 | 6/2016 | Liu | |
| 2016/0330107 | A1 | 11/2016 | Thubert et al. | |
| 2016/0380776 | A1* | 12/2016 | Thubert | H04L 63/0823 713/175 |
| 2017/0063685 | A1 | 3/2017 | Vedantham et al. | |
| 2017/0245132 | A1 | 8/2017 | Tsuchie | |
| 2019/0394737 | A1 | 12/2019 | Luo | |
| 2020/0154339 | A1* | 5/2020 | Singh | H04L 61/5007 |
| 2020/0336547 | A1* | 10/2020 | Sabharwal | H04W 40/246 |
| 2021/0250841 | A1* | 8/2021 | Furukawa | H04W 40/246 |
| 2021/0258240 | A1* | 8/2021 | Gresset | H04L 47/829 |

FOREIGN PATENT DOCUMENTS

| | | |
|---|---|---|
| CN | 108574970 A | 9/2018 |
| CN | 109640372 A | 4/2019 |
| JP | 2005117656 A | 4/2005 |
| JP | 2005527139 A | 9/2005 |
| JP | 2017152906 A | 8/2017 |
| JP | 2018526948 A | 9/2018 |
| WO | 03/079611 A1 | 9/2003 |
| WO | 2015021638 A1 | 2/2015 |
| WO | 2015027406 A1 | 3/2015 |

OTHER PUBLICATIONS

Sheeraz A. Alvi et al., On Route Maintenance and Recovery Mechanism of RPL, International Wireless Communications and Mobile Computing Conference IEEE, No. 3, Jul. 19, 2017, pp. 1933-1938.
Search Report dated Jul. 15, 2022 for European patent application No. 19893491.1.
First Office Action dated May 31, 2022 for Japanese patent application No. 2021-531355, English translation provided by Global Dossier.
Sneha K et al: "An efficient hand-off optimization based RPL routing protocol for optimal route selection in mobility enabled LLNs", 2016 International Conference on Global Trends in Signal Processing, Information Computing and Communication (ICGTSPIC-C),IEEE, Dec. 22, 2016 (Dec. 22, 2016), pp. 130-137, XP033106999.
Fotouhi Hossein et al: "mRPL+: A mobility management framework in RPL/6LoWPAN", Computer Communications, Elsevier Science Publishers BV, Amsterdam, NL, vol. 104, Feb. 13, 2017 (Feb. 13, 2017), pp. 34-54, XP029976016.
Hung-Yu Wei et al: "Seamless Handoff Support in Wireless Mesh Networks", Operator-Assisted (Wireless Mesh) Community Networks, 2006 1st Worksho P On, IEEE, PI,Sep. 1, 2006 (Sep. 1, 2006), pp. 1-8, XP031066010.
Winter T et al: RPL: "IPv6 Routing Protocol for Low-Power and Lossy Networks; rfc6550.txt", RPL: IPV6 Routing Protocol for Low-Power and Lossy Networks ; RFC6550.TXT, Internet Engineering Task Force, IETF ; Standard, Internet Society (ISOC) 4, Rue Des Falaises CH—1205 Geneva, Switzerland, Mar. 26, 2012 (Mar. 26, 2012), p. 1-157, XP015081473.

* cited by examiner

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type = 0x0A  |    Length     |  Optional destination Address *  |
+-+-+-+-+-+-+-+-+-+-+-+-+-+-+-+-+-+-+-+-+-+-+-+-+-+-+-+-+-+-+-+-+
```

```
 0 1 2 3 4 5 6 7 8 9 0 1 2 3 4 5 6 7 8 9 0 1 2 3 4 5 6 7 8 9 0 1 2 3 4 5
+-+-+-+-+-+-+-+-+-+-+-+-+-+-+-+-+-+-+-+-+-+-+-+-+-+-+-+-+-+-+-+-+-+-+-+-+
| Type = 0x0A   |    Length     | Disconnect Req|     New Parent Address
+-+-+-+-+-+-+-+-+-+-+-+-+-+-+-+-+-+-+-+-+-+-+-+-+-+-+-+-+-+-+-+-+-+-+-+-+
```

Figure 4

```
 0 1 2 3 4 5 6 7 8 9 0 1 2 3 4 5 6 7 8 9 0 1 2 3 4 5 6 7 8 9 0 1 2 3 4 5
+-+-+-+-+-+-+-+-+-+-+-+-+-+-+-+-+-+-+-+-+-+-+-+-+-+-+-+-+-+-+-+-+-+-+-+-+
| Type = 0x0B   |    Length     |  Connect Req  |     Old Parent Address
+-+-+-+-+-+-+-+-+-+-+-+-+-+-+-+-+-+-+-+-+-+-+-+-+-+-+-+-+-+-+-+-+-+-+-+-+
```

Figure 5

```
 0 1 2 3 4 5 6 7 8 9 0 1 2 3 4 5 6 7 8 9 0 1 2 3 4 5 6 7 8 9 0 1 2 3 4 5
+-+-+-+-+-+-+-+-+-+-+-+-+-+-+-+-+-+-+-+-+-+-+-+-+-+-+-+-+-+-+-+-+-+-+-+-+
|1 1 1 1 0 0 0 0| F |O|D| Reserved |  Origination  ,  Destination Address
                                      Address
+-+-+-+-+-+-+-+-+-+-+-+-+-+-+-+-+-+-+-+-+-+-+-+-+-+-+-+-+-+-+-+-+-+-+-+-+
```

Figure 6

IPV6 NODE MOBILITY MANAGEMENT METHOD BASED ON RPL ROUTING PROTOCOL

CROSS REFERENCE OF RELATED APPLICATION

This application is a National Stage application of PCT international application PCT/CN2019/112156, filed on Oct. 21, 2019, which claims priority to Chinese Patent Application No. 201811476188.1, titled "IPV6 NODE MOBILITY MANAGEMENT METHOD BASED ON RPL ROUTING PROTOCOL", filed on Dec. 4, 2018 with the China National Intellectual Property Administration (CNIPA), which are incorporated herein by reference in their entirety.

FIELD

The present disclosure relates to the technical field of wireless sensor network, and particularly, to a method for mobility management of nodes in an IPv6 over Low-Power Wireless Personal Area Network based on Routing Protocol for Low-Power and Lossy Networks (RPL).

BACKGROUND

The IPv6 over Low-Power Wireless Personal Area Network (Wireless Sensor Network) has always been a current research hotspot, with features such as multiple functions, flexible deployment, low power consumption, and low cost. At present, the wireless sensor network is widely used in various industries with its unique advantages, including military and national defense, agricultural environment, medical monitoring, smart home, industrial control, and logistics management. In recent years, due to increasing demand for new applications of the wireless sensor network, static wireless sensor network is no longer suitable for application environments that require mobile operations. Therefore, there is a concept of adding a mobile node to the traditional network. However, mobility of the IPv6 over Low-Power Wireless Personal Area Network causes some problems, such as data loss due to node disconnection during handover, and negative impact on application performance. It is particularly important to introduce a method for mobility management of nodes in the IPv6 over Low-Power Wireless Personal Area Network.

At present, a variety of IPv6-based mobility technologies have been proposed in the field of the IPv6 over Low-Power Wireless Personal Area Network. Although the mobility technologies can solve mobility problem of nodes in the wireless sensor network, there are still problems of high delay, complicated interaction process, and data loss in a process of mobility detection and mobility handover. Therefore, a method for mobility management of nodes in the IPv6 over Low-Power Wireless Personal Area Network is proposed and implemented in combination with an existing routing protocol. Internet Engineering Task Force (IETF) Routing over Lossy and Low-power Networks (RoLL) working group formulates the RPL, and the RoLL designs an internal mechanism of the RPL for a static network, making the RPL not suitable for mobile scenarios.

In order to meet a requirement of the wireless sensor network for mobility support, and solve the problems of high delay when selecting an optimal parent node during the node moving process and data loss during handover, a method for mobility management of nodes in the IPv6 over Low-Power Wireless Personal Area Network based on the RPL is provided in the present disclosure.

SUMMARY

In view of this, in order to reduce delay and energy consumption in a process of node mobility detection and a process of optimal parent node selection, and improve an arrival rate of an end-to-end data packet, a method for mobility management of nodes in the IPv6 over Low-Power Wireless Personal Area Network based on RPL is provided in the present disclosure. This method completes the selection of the optimal parent node of a mobile node based on a quality index of a two-way link and by improving a RPL control message. In addition, a cache mechanism is designed for data in network communication to prevent the data sent to the mobile node from being lost. This method enables nodes of the IPv6 over Low-Power Wireless Personal Area Network to have a function of mobility management, realizes functions of node mobility handover and data caching, which improves accuracy of node mobility detection in IPv6 over Low-Power Wireless Personal Area Network, reduces link handover delay of the mobile node and node energy consumption, avoids data packet loss during node movement, and improve reliability of the network.

To achieve the above objectives, the present disclosure provides the following technical solutions.

A method for mobility management of nodes in the IPv6 over Low-Power Wireless Personal Area Network based on RPL, including following steps:

S1: in the IPv6 over Low-Power Wireless Personal Area Network with mobile nodes, obtaining, by the mobile node, a received signal strength indication (RSSI) of two-way communication link after the mobile node sends a message to the mobile node's parent node and the parent node receives the message, records an RSSI of a corresponding link, and puts the recorded RSSI into a corresponding acknowledge character (ACK) frame load to reply to the mobile node; sending actively, by the mobile node, a beacon request frame to obtain the RSSI if the mobile node does not perform message interaction with the parent node for a period of time;

S2: obtaining, by the mobile node using an average filtering method, an average RSSI (ARSSI) after the mobile node obtains the RSSI of the two-way communication link with the parent node, and comparing the ARSSI with a set threshold; if the ARSSI is less than the threshold, determining that the node is moving and is moving away from the parent node, and not immediately disconnecting a current link of the mobile node; if the ARSSI is not less than the threshold, turning to step S1;

S3: multicasting, by the mobile node, a directed acyclic graph information solicitation (DIS) message with a mobile identifier, to search for a new parent node around, after the mobile node detects that it is moving away from the parent node;

S4: after non-leaf nodes around the mobile node receive the DIS message with the mobile identifier, calculating, by each of the nodes, fallback time according to the RSSI of the request message and a distributed competition algorithm, and replying to the mobile node a directed acyclic graph information object (DIO) message with an identifier according to the fallback time;

S5: after the mobile node finds out the new parent node, sending, by the mobile node, a disconnected destination advertisement object (DAO) message to the original parent node to request to disconnect the original link and clear an old routing table, and forward the DAO message to an upper-level node to delete all routing entries related to the mobile node; and sending, by the mobile node, a Connected DAO message to the new parent node to request to connect to the new parent node and update the routing table, and forward the Connected DAO message to an upper-level node until a complete communication path is established;

S6: confirming data to be cached; after the mobile node disconnects the original link, if there is no data to be sent to the mobile node during the disconnection process, ending the mobility management; if there is data to be sent to the mobile node during the disconnection process, finding, by the original parent node, a cache node for the data to be sent to the mobile node: if the original parent node receives the Disconnected DAO message, caching the data to be sent to the mobile node to the new parent node; if the original parent node does not receive the Disconnected DAO message due to some reasons, caching the data to a root node of the network;

S7: after the original parent node confirms the cache node, that is, finds out a cache location for the data, putting, by the original parent node, an IPv6 address of the cache node in a cache header of a 6LoWPAN message of the data to be cached, and then forwarding the data to the cache node for caching; and S8: after the mobile node connects to the new parent node and updates the network routing table, sending, by the cache node, the cached data to the mobile node, and ending the mobility management.

Furthermore, in step S1, after putting the RSSI into the ACK frame load, a format of an improved ACK frame formed comprises: a frame control bit, a serial number, the RSSI, and a frame check sequence (FCS).

Furthermore, in step S3, Option format of the DIS message with the mobile identifier comprises: a type description field, a length, and a destination address; when Option Type in the DIS control message is 0x0A, it indicates that the DIS control message is sent by the mobile node.

Furthermore, in step S4, the distributed competition algorithm is: after receiving the DIS message with the mobile identifier, a candidate node calculates its fallback time according to the RSSI, activates a built-in timer, and starts to compete a response in a time window according to its fallback time; the larger the RSSI, the smaller the fallback time and the shorter overflow time of the timer; a calculation formula is as follows:

$$t_n = \left(1 - \frac{RSSI_n}{RSSI_{max}}\right) t_h$$

where, $t_n$ represents the fallback time of node n, $RSSI_n$ represents the RSSI of node n, $RSSI_{max}$ represents the largest RSSI between two nodes, and $t_h$ represents a set maximum fallback time, in unit of microsecond.

Furthermore, in step S4, in multicasting, by the mobile node, the DIS message to search for the new parent node and performing mobile identification on the DIO message sent by the candidate parent node after the distributed competition algorithm, the 8th bit of MAC frame control field is set as a DIO identifier bit to identify the DIO message for responding to the DIS message with the mobile identifier, when encapsulating the DIO message at MAC layer.

Furthermore, in step S4, all candidate nodes remain in a monitoring state during a timing process until the timer overflows and interruption occurs; a candidate node with the largest RSSI value (a node with the best link quality with the mobile node before) first ends the timing; the remaining candidate node, if monitoring the DIO message with the mobile identifier, interrupts the timing and does not reply the DIO message with the identifier to the mobile node; the remaining candidate node, if not monitoring the DIO message with the identifier until the end of the timer, replies to the mobile node with the DIO message with the identifier.

Furthermore, in step S4, the candidate node whose timer ends competes to obtain a right of responding with the DIO message, identifies the DIO message first, and then unicasts the DIO message to the mobile node. In implement modes of the present disclosure, different from original RPL protocol affecting the DIO message, the Trickle timer won't be reset in this step, which avoids network congestion.

Furthermore, in step S5, Option format of the Disconnected DAO message comprises: a type description field, a length, a disconnection request identifier, and an IPv6 address of the new parent node; when Option Type of the DAO message is 0x0A, it indicates that the DAO message is identified as the disconnected DAO message to request to disconnect the current link.

Furthermore, in step S5, Option format of the Connected DAO message comprises: a type description field, a length, a connection request identifier, and an IPv6 address of the original parent node; when Option Type of the DAO message is 0x0B, it indicates that the DAO message is identified as a Connected DAO message to request establishment of a new link.

Furthermore, in step S7, a format of a new cache header of the 6LoWPAN formed by putting the IPv6 address of the cache node in the cache header of the 6LoWPAN message of the data to be cached comprises: a header type, a flag bit, a long-short address identification bit of a source address, a long-short address identification bit of a destination address, a source IPv6 address of a data packet, and a destination IPv6 address of the data packet.

Beneficial effects of the present disclosure are as follows:

1) The present disclosure can effectively reduce link handover delay of the process of node movement in the IPv6 over Low-Power Wireless Personal Area Network, ensure stability of the network link, and improve reliability of the network. Based on the RSSI mobility detection of the two-way link, the optimal parent node is selected without disconnecting the original link, and then the delay fallback and optimal selection of the candidate nodes are completed through the improved DIS and DAO messages. While compatible with the original RPL, the present disclosure completes the process of mobility detection, optimal selection, and mobility handover, which effectively solves the problems of high delay and high energy consumption in the process of mobility handover of the IPv6 over Low-Power Wireless Personal Area Network.

2) The present disclosure can effectively improve an end-to-end transmission success rate of messages in the IPv6 over Low-Power Wireless Personal Area Network, and improve transmission reliability of the network. The present disclosure designs a cache algorithm for the data sent to the mobile node and modifies the 6LoWPAN header of the cache data to ensure that the mobile node can normally receive the data before the handover during the process of mobility handover or after the link handover, thereby avoiding data loss.

BRIEF DESCRIPTION OF THE DRAWINGS

In order to make the objectives, technical solutions and beneficial effects of the present disclosure clearer, the following drawings are provided in the present disclosure for illustration:

FIG. 4 is a diagram of a frame format of a Disconnected DAO message of the RPL protocol according to the present disclosure;

FIG. 5 is a diagram of a frame format of a Connected DAO message of the RPL protocol according to the present disclosure; and FIG. 6 is a diagram of a frame format of a header of 6LoWPAN according to the present disclosure.

DETAILED DESCRIPTION

The preferred embodiments of the present disclosure will be described in detail as follows in conjunction with the drawings.

Figure 1:
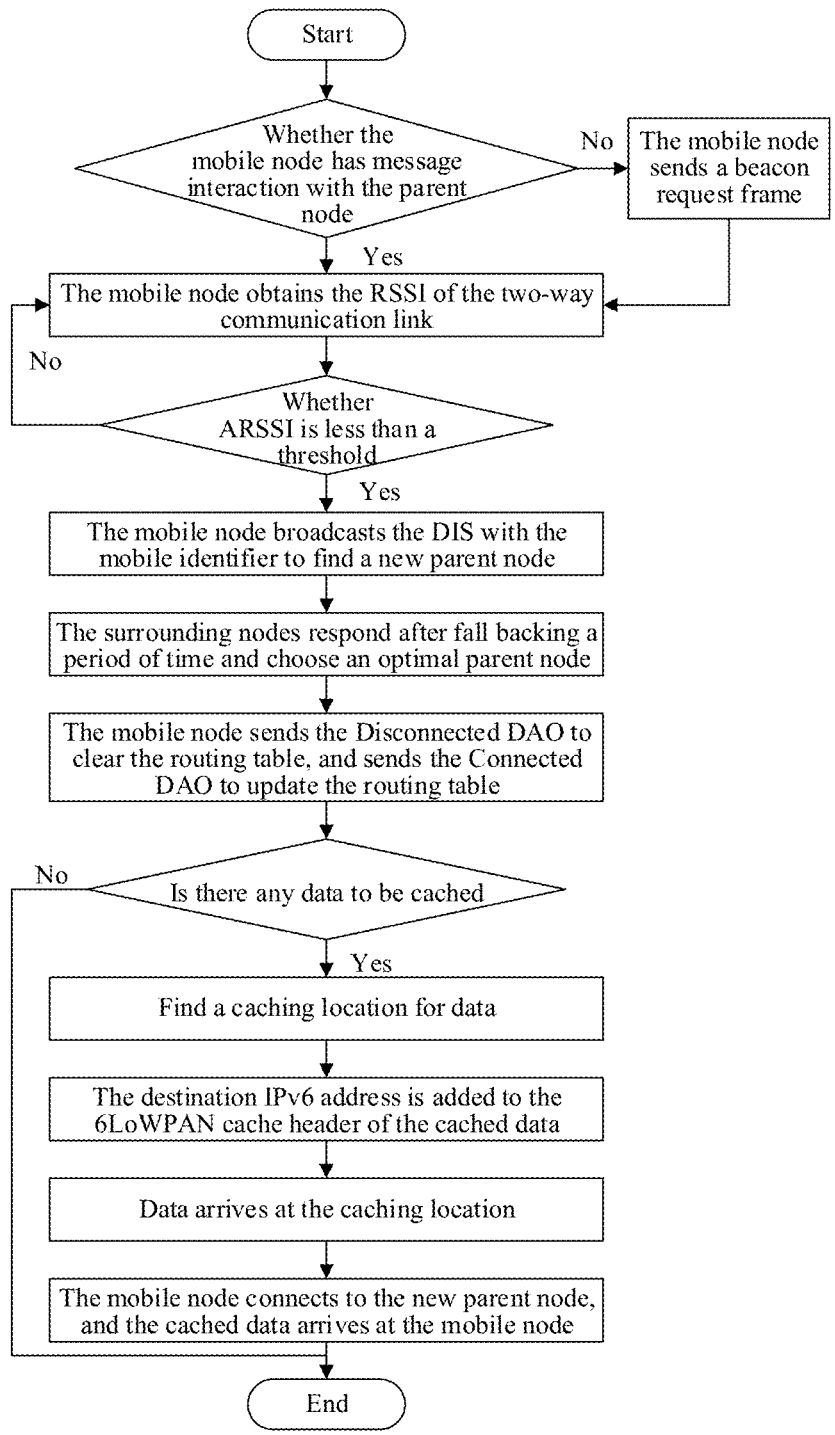
FIG. 1 is a flow diagram of a method for mobility management according to the present disclosure.

FIG. 1 is a flow diagram of a method for mobility management of nodes in IPv6 over Low-Power Wireless Personal Area Network based on RPL according to the present disclosure. This method detects mobility of a node based on RSSI of a two-way link, completes a selection of an optimal parent node by multicasting a DIS message with mobile identifier and a fallback algorithm, designs a caching algorithm for data in network communication, caches the data to a new parent node or a root node, and redesigns a header of a 6LoWPAN message. As illustrated in FIG. 1, a specific implementation process of the method for mobility management of a node is described as steps S1 to S8.

In step S1: in the IPv6 over Low-Power Wireless Personal Area Network with a mobile node, when the mobile node sends a message to its parent node, the parent node receives the message and records a received signal strength indication (RSSI) of this link, then puts the recorded RSSI into a corresponding acknowledge character (ACK) frame load to reply to the mobile node. The mobile node obtains the RSSI of the two-way communication link. If the mobile node does not perform message interaction with the parent node for a period of time, the mobile node actively sends a beacon request frame to obtain the RSSI.

In step S2: after obtaining the RSSI of the two-way communication link, the mobile node uses an average filtering method to obtain an average RSSI (ARSSI), and compares the ARSSI with a set threshold. If the ARSSI is less than the threshold, it is determined that the node is moving and is moving away from the parent node, but the mobile node will not immediately disconnect the current link. If the ARSSI is not less than the threshold, turn to step S1.

In step S3: after the mobile node detects that it is moving away from the parent node, the mobile node starts multicasting a directed acyclic graph information solicitation (DIS) message with a mobile identifier, and searches for a new parent node around.

In step S4: after a non-leaf node around the mobile node receives the DIS message with the mobile identifier, each node calculates fallback time according to the RSSI of the request message and a distributed competition algorithm, and replies a directed acyclic graph information object (DIO) message with an identifier to the mobile node according to the fallback time.

That is, the non-leaf nodes obtain their own RSSI, and each node calculates the fallback time according to the RSSI and the newly designed distributed competition algorithm in this method, and then replies the DIO message to the mobile node according to the fallback time. A non-leaf node with the largest RSSI replies first, and the first reply node is an optimal new parent node. If other node monitors that there is a DIO message replied to the mobile node, the other node cancels its own fallback process and does not reply the DIO message to the mobile node. In this process, all nodes only reply one DIO message, and do not reset a Trickle timer.

The distributed competition algorithm is specifically as follows: after receiving the DIS message with the mobile identifier, a candidate node calculates its own fallback time according to the RSSI, activates a built-in timer, and starts to compete a response in a time window according to its own fallback time. The larger the RSSI, the smaller the fallback time and the shorter overflow time of the timer. A calculation formula is as follows:

$$t_n = \left(1 - \frac{RSSI_n}{RSSI_{max}}\right) t_h$$

$t_n$ represents the fallback time of node n, $RSSI_n$ represents the RSSI of node n, $RSSI_{max}$ represents the largest RSSI between two nodes, and $t_h$ represents a set maximum fallback time, in unit of microsecond.

It should be noted that when the mobile node searches for the new parent node by multicasting the DIS message, not only the candidate node sends the DIO message, but other node also sends the DIO message accordingly. Therefore, it is necessary to perform mobile identification on the DIO message sent by the candidate node after performing the distributed competition algorithm. Specifically, when the candidate node encapsulates the DIO message at MAC layer, the 8th bit of the MAC frame control field is set as a DIO identifier bit to identify the DIO message for responding to the DIS message with the mobile identifier.

In addition, in step S4, all candidate nodes remain in a monitoring state during a timing process until the timer overflows and interruption occurs. A candidate node with the largest RSSI value (a node having the best link quality with the mobile node before) ends the timing first. If the remaining candidate node detects the DIO message with the mobile identifier, the remaining candidate node interrupts the timing and does not reply the DIO message with the identifier to the mobile node. If the remaining candidate node does not detect the DIO message with the identifier until the end of timing, the candidate node replies to the mobile node with the DIO message with the identifier.

In addition, in step S4, the candidate node whose timer ends competes to obtain a right of responding the DIO message. The candidate node identifies the DIO message first, and then unicasts the DIO message to the mobile node. Unlike a DIO message corresponding to original RPL protocol, the Trickle timer is not reset in this step, which avoids network congestion.

In step S5: after finding the new parent node, the mobile node sends a disconnected destination advertisement object (Disconnected DAO) message to the original parent node, to request to disconnect the original link and clear an old routing table, and then forward the Disconnected DAO message to an upper-level node, to delete all routing entries related to the mobile node. The mobile node also sends a Connected DAO message to the new parent node, to request to connect to the new parent node and update the routing table, and forward the DAO message to an upper-level node, until a complete communication path is established.

In step S6: data to be cached is confirmed. After the mobile node disconnects the original link, a process of mobility management ends if there is no data to be sent to the mobile node during the disconnection process. If there is data to be sent to the mobile node during the disconnection process, the original parent node needs to find a cache node for data to be sent to the mobile node. If the original parent node receives the Disconnected DAO message, the original parent node caches the data to be sent to the mobile node to the new parent node; if the original parent node does not receive the Disconnected DAO message due to some reasons, the original parent node caches the data to a root node of the network.

In step S7: after the original parent node confirms the cache node, that is, after finding a cache location for the data, the original parent node puts an IPv6 address of the cache node in a cache header of 6LoWPAN of the data to be cached, and then forwards the data to the cache node for caching.

In step S8: after the mobile node connects to the new parent node and updates the network routing table, the cache node sends the cached data to the mobile node. At this point, the process of mobility management ends.

Figures 2, 3:
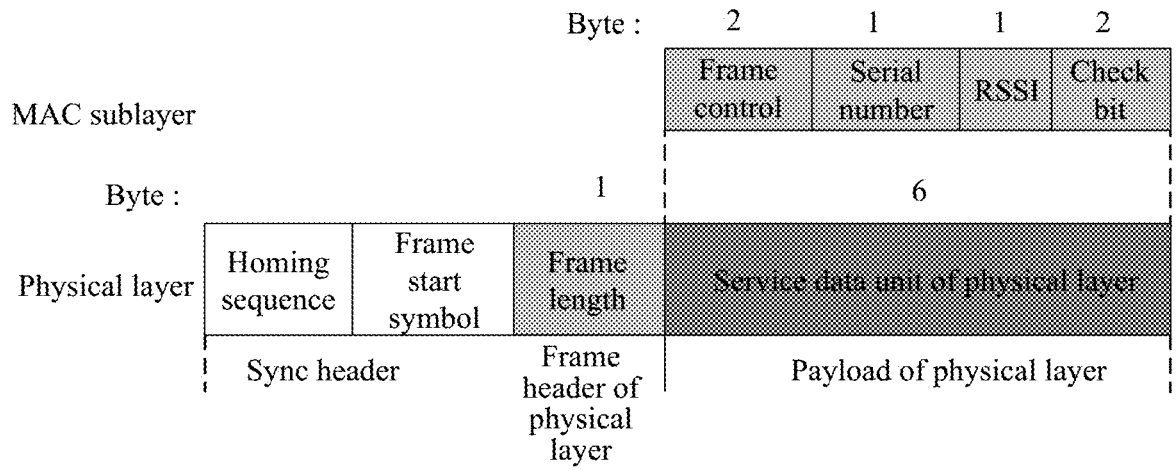
FIG. 2 is a diagram of a frame format of an acknowledge character (ACK) according to the present disclosure.
FIG. 3 is a diagram of a frame format of a DIS message of RPL protocol according to the present disclosure.

FIG. 2 is a diagram of a format of the ACK frame load in the present disclosure. Main content of the frame format of the ACK includes a frame control bit, a serial number, the RSSI, and a frame check sequence FCS. The length of RSSI is 8 bits.

FIG. 3 is a diagram of a frame format of the DIS message of the RPL protocol in the present disclosure. The DIS message with the mobile identifier includes an optional type description field (Type), an optional length (Length), and an optional destination address (Destination Address). Option of the DIS message must have a type description field, which has a value of 0x0A and a length of 8 bits. Length represents the number of bytes of the improved DIS Option, and its length is 8 bits. Destination Address represents a reserved destination address bit, and its length is determined by length of a long address or a short address.

FIG. 4 is a diagram of a frame format of the Disconnected DAO message of the RPL protocol in the present disclosure. Option of the Disconnect DAO message includes an optional type description field (Type), an optional length (Length), a disconnect request identifier (Disconnect Req), and the new parent address (New Parent Address). A value of Type is 0x0A, which has length of 8 bits. Length represents the number of bytes of Option, and its length is 8 bits. Disconnect Req represents a flag bit for requesting to disconnect the original connection, and its length is 8 bits. New Parent Address represents the IPv6 address of the new parent node, and its length is determined by the length of the long address or the short address.

FIG. 5 is a diagram of a frame format of the Connected DAO message of the RPL protocol in the present disclosure. Option of the Connected DAO message includes an optional type description field (Type), an optional length (Length), and a disconnect request identifier (Connect Req), and an old parent address. A value of Type is 0x0B, which has a length of 8 bits. Length represents the number of bytes of Option, and its length is 8 bits; Connect Req represents a connection request flag bit, and its length is 8 bits. Old Parent Address represents the IPv6 address of the original parent node, and its length is determined by the length of the long address or the short address.

FIG. 6 is a diagram of a frame format of a cache header of 6LoWPAN in the present disclosure. A cache header of the newly designed 6LoWPAN includes a header type (Header Type), a flag bit (F), a short-long address identify bit of a source address (O), a short-long address identify bit of a destination address (D), an origination IPv6 address of a data packet (Original Address), a destination IPv6 address of a data packet (Destination Address). A value of Head Type is 0xF0, which has length of 8 bits. Length of F, O, and D is 1 bit each. Length of Origin Address and Destination Address is determined by the length of the long address or the short address.

Finally, it should be noted that the above preferred embodiments are only used to illustrate the technical solutions of the present disclosure and not to limit them. Although the present disclosure has been described in detail through the above preferred embodiments, those skilled in the art should understand that various changes can be made to the technical solutions of the present disclosure in form and detail without departing from the scope defined by the claims of the present disclosure.

The invention claimed is:

1. A method for mobility management of nodes in an IPv6 over Low-Power Wireless Personal Area Network based on RPL, wherein, the method comprises following steps:

S1: in the IPv6 over Low-Power Wireless Personal Area Network with a mobile node, obtaining, by the mobile node, a received signal strength indication (RSSI) of two-way communication link after the mobile node sends a message to the mobile node's parent node and the parent node receives the message, records an RSSI of a corresponding link, and puts the recorded RSSI into a corresponding acknowledge character (ACK) frame load to reply to the mobile node; sending actively, by the mobile node, a beacon request frame to obtain the RSSI if the mobile node does not perform message interaction with the parent node for a period of time;

S2: obtaining, by the mobile node using an average filtering method, an average RSSI (ARSSI) after the mobile node obtains the RSSI of the two-way communication link with the parent node, and comparing the ARSSI with a set threshold; if the ARSSI is less than the threshold, determining that the node is moving and is moving away from the parent node, and not immediately disconnecting a current link of the mobile node; if the ARSSI is not less than the threshold, turning to step S1;

S3: multicasting, by the mobile node, a directed acyclic graph information solicitation (DIS) message with a mobile identifier, to search for a new parent node around, after the mobile node detects that it is moving away from the parent node;

S4: after non-leaf nodes around the mobile node receive the DIS message with the mobile identifier, calculating, by each of the nodes, fallback time according to the RSSI of the request message and a distributed competition algorithm, and replying to the mobile node a directed acyclic graph information object (DIO) message with an identifier according to the fallback time;

S5: after the mobile node finds out the new parent node, sending, by the mobile node, a disconnected destination advertisement object (DAO) message to the original parent node to request to disconnect the original link and clear an old routing table, and forward the DAO message to an upper-level node to delete all routing entries related to the mobile node; and sending, by the mobile node, a Connected DAO message to the new parent node to request to connect to the new parent node and update the routing table, and forward the Connected DAO message to an upper-level node until a complete communication path is established;

S6: confirming data to be cached; after the mobile node disconnects the original link, if there is no data to be sent to the mobile node during the disconnection process, ending the mobility management; if there is data to be sent to the mobile node during the disconnection process, finding, by the original parent node, a cache node for the data to be sent to the mobile node: if the original parent node receives the Disconnected DAO message, caching the data to be sent to the mobile node to the new parent node; if the original parent node does not receive the Disconnected DAO message due to some reasons, caching the data to a root node of the network;

S7: after the original parent node confirms the cache node, that is, finds out a cache location for the data, putting, by the original parent node, an IPv6 address of the cache node in a cache header of a 6LoWPAN message of the data to be cached, and then forwarding the data to the cache node for caching; and S8: after the mobile node connects to the new parent node and updates the network routing table, sending, by the cache node, the cached data to the mobile node, and ending the mobility management.

2. The method for mobility management of nodes in an IPv6 over Low-Power Wireless Personal Area Network based on RPL according to claim 1, wherein, in step S1, after putting the RSSI into the ACK frame load, a format of an improved ACK frame formed comprises: a frame control bit, a serial number, the RSSI, and a frame check sequence (FCS).

3. The method for mobility management of nodes in an IPv6 over Low-Power Wireless Personal Area Network based on RPL according to claim 1, wherein, in step S3, Option format of the DIS message with the mobile identifier comprises: a type description field, a length, and a destination address; when Option Type in the DIS control message is 0x0A, it indicates that the DIS control message is sent by the mobile node.

4. The method for mobility management of nodes in an IPv6 over Low-Power Wireless Personal Area Network based on RPL according to claim 1, wherein, in step S4, the distributed competition algorithm is: after receiving the DIS message with the mobile identifier, a candidate node calculates its fallback time according to the RSSI, activates a built-in timer, and starts to compete a response in a time window according to its fallback time; the larger the RSSI, the smaller the fallback time and the shorter overflow time of the timer; a calculation formula is as follows:

$$t_n = \left(1 - \frac{RSSI_n}{RSSI_{max}}\right) t_h$$

wherein, $t_n$ represents the fallback time of node n, $RSSI_n$ represents the RSSI of node n, $RSSI_{max}$ represents the largest RSSI between two nodes, and $t_h$ represents a set maximum fallback time, in unit of microsecond.

5. The method for mobility management of nodes in an IPv6 over Low-Power Wireless Personal Area Network based on RPL according to claim 1, wherein, in step S4, in multicasting, by the mobile node, the DIS message to search for the new parent node and performing mobile identification on the DIO message sent by the candidate parent node after the distributed competition algorithm, the 8th bit of MAC frame control field is set as a DIO identifier bit to identify the DIO message for responding to the DIS message with the mobile identifier, when encapsulating the DIO message at MAC layer.

6. The method for mobility management of nodes in an IPv6 over Low-Power Wireless Personal Area Network based on RPL according to claim 1, wherein, in step S4, all candidate nodes remain in a monitoring state during a timing process until the timer overflows and interruption occurs; a candidate node with the largest RSSI value (a node with the best link quality with the mobile node before) first ends the timing; the remaining candidate node, if monitoring the DIO message with the mobile identifier, interrupts the timing and does not reply the DIO message with the identifier to the mobile node; the remaining candidate node, if not monitoring the DIO message with the identifier until the end of the timer, replies to the mobile node with the DIO message with the identifier.

7. The method for mobility management of nodes in an IPv6 over Low-Power Wireless Personal Area Network based on RPL according to claim 1, wherein, in step S4, the candidate node whose timer ends competes to obtain a right of responding with the DIO message, identifies the DIO message first, and then unicasts the DIO message to the mobile node.

8. The method for mobility management of nodes in an IPv6 over Low-Power Wireless Personal Area Network based on RPL according to claim 1, wherein, in step S5, Option format of the Disconnected DAO message comprises: a type description field, a length, a disconnection request identifier, and an IPv6 address of the new parent node; when Option Type of the DAO message is 0x0A, it indicates that the DAO message is identified as the disconnected DAO message to request to disconnect the current link.

9. The method for mobility management of nodes in an IPv6 over Low-Power Wireless Personal Area Network based on RPL according to claim 1, wherein, in step S5, Option format of the Connected DAO message comprises: a type description field, a length, a connection request identifier, and an IPv6 address of the original parent node; when Option Type of the DAO message is 0x0B, it indicates that the DAO message is identified as a Connected DAO message to request establishment of a new link.

10. The method for mobility management of nodes in an IPv6 over Low-Power Wireless Personal Area Network based on RPL according to claim 1, wherein, in step S7, a format of a new cache header of the 6LoWPAN formed by putting the IPv6 address of the cache node in the cache header of the 6LoWPAN message of the data to be cached comprises: a header type, a flag bit, a long-short address identification bit of a source address, a long-short address identification bit of a destination address, a source IPv6 address of a data packet, and a destination IPv6 address of the data packet.

* * * * *